(No Model.) 3 Sheets—Sheet 2.
C. A. A. RAND.
REEL SUPPORTING DEVICE FOR HARVESTERS.
No. 590,464. Patented Sept. 21, 1897.
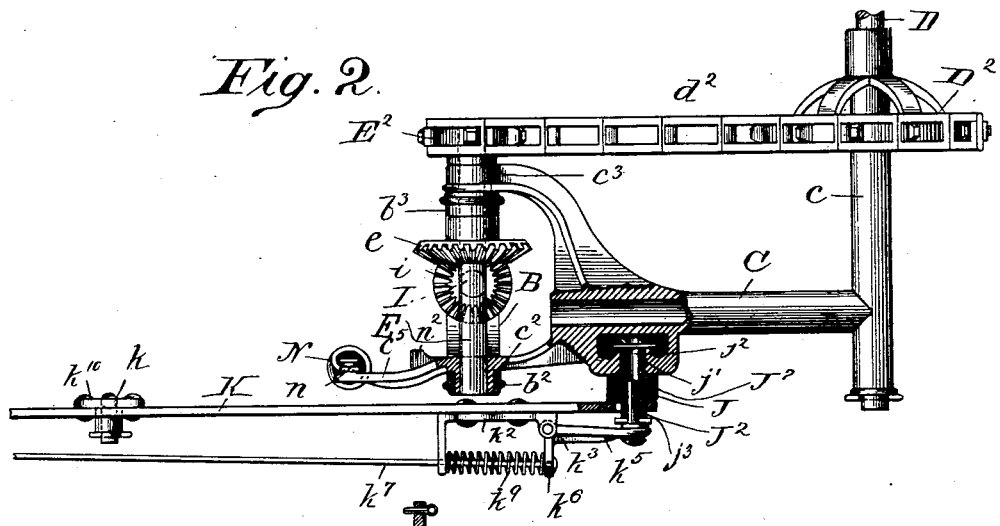
Fig. 2.
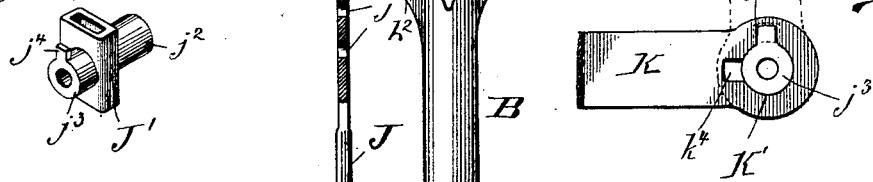
Fig. 3.
Fig. 7.
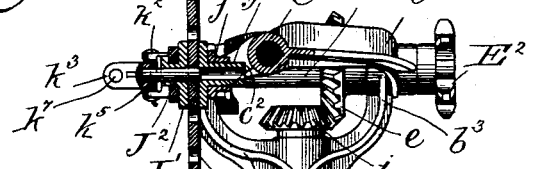
Fig. 8.
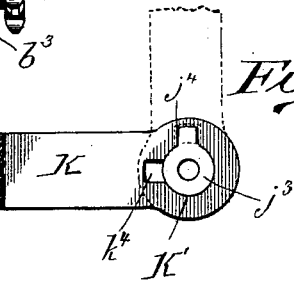
Witnesses
Arthur Johnson
Louis O. Wenzler
Inventor
Charles A. Anderson Rand (No Model.) 3 Sheets—Sheet 3.

C. A. A. RAND.
REEL SUPPORTING DEVICE FOR HARVESTERS.

No. 590,464. Patented Sept. 21, 1897.

Witnesses
Arthur Johnson
Louis O. Hensley

Inventor
Charles A. Anderson Rand

UNITED STATES PATENT OFFICE.

CHARLES A. ANDERSON RAND, OF CHICAGO, ILLINOIS.

REEL-SUPPORTING DEVICE FOR HARVESTERS.

SPECIFICATION forming part of Letters Patent No. 590,464, dated September 21, 1897.

Application filed September 9, 1895. Serial No. 561,917. (No model.)

*To all whom it may concern:*

Be it known that I, CHARLES A. ANDERSON RAND, of Chicago, in the county of Cook and State of Illinois, have invented certain new and useful Improvements in Reel-Supporting Devices for Harvesters, of which the following is a full description, reference being had to the accompanying drawings, in which—

Figure 1:
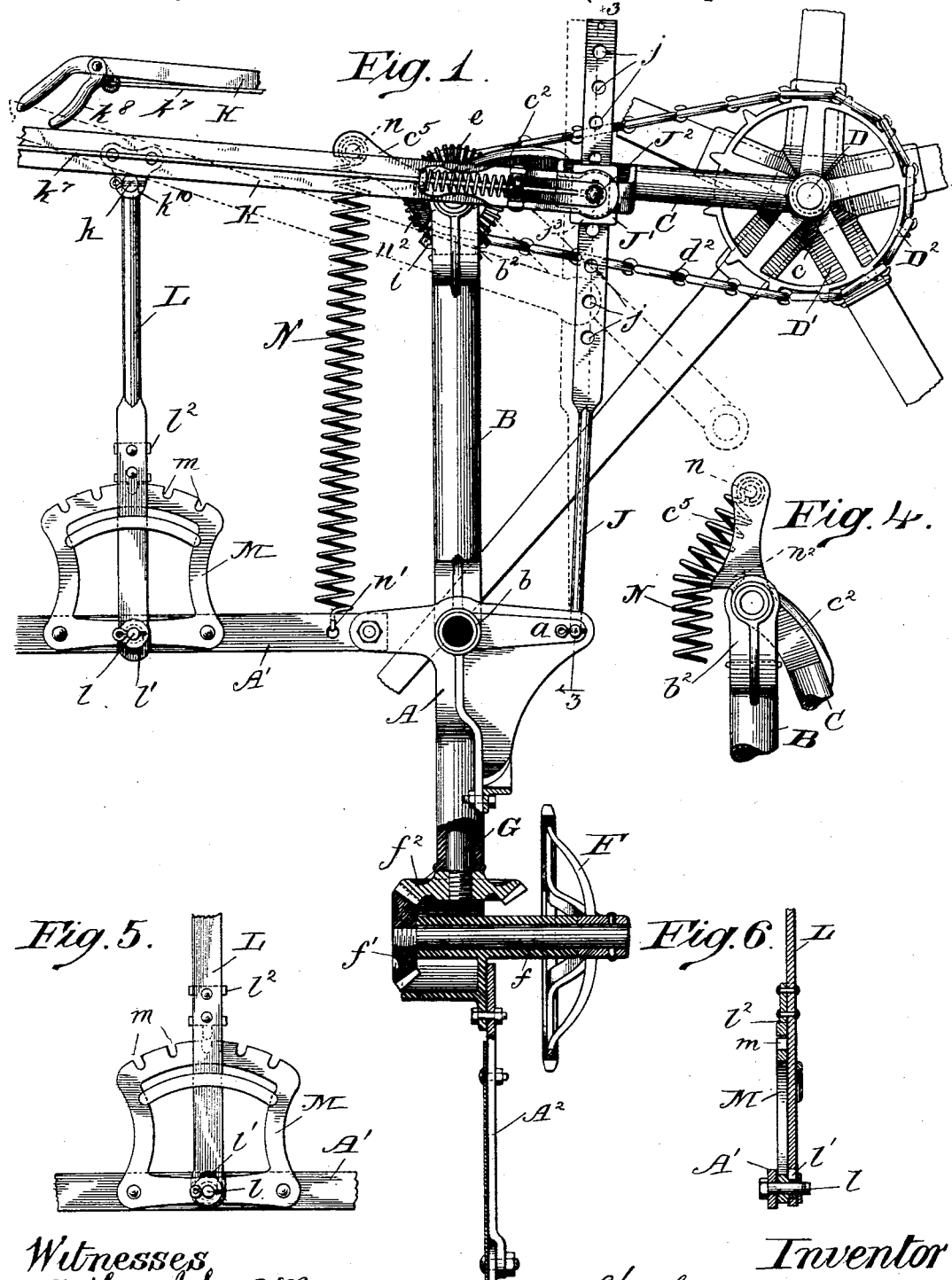
Figure 9:
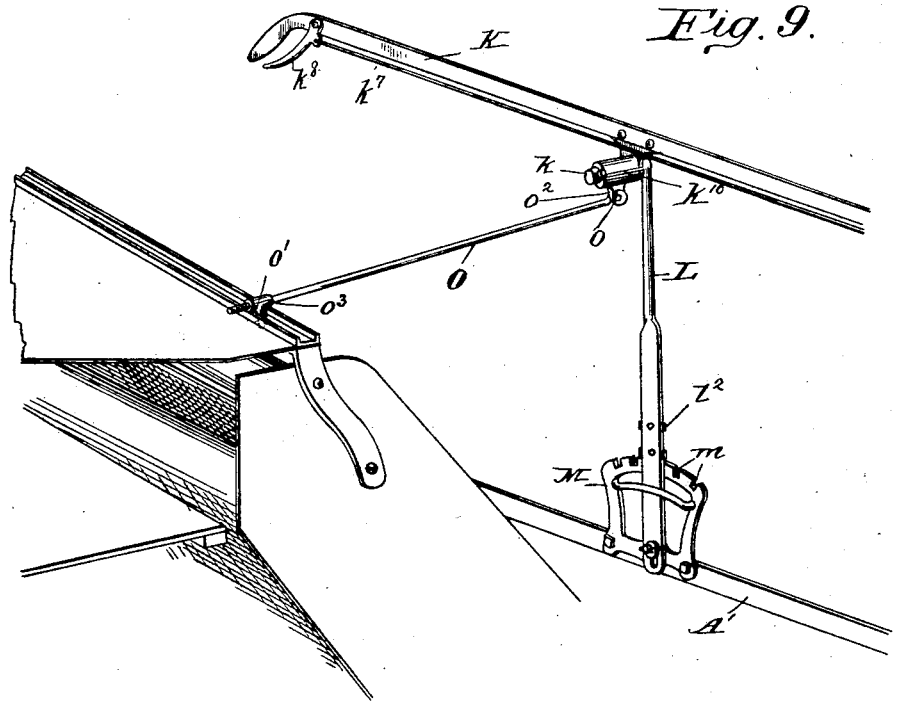

Figure 1 is a side elevation. Fig. 2 is a plan view, certain parts being shown in section. Fig. 3 is a front sectional elevation on the line 3 3 of Fig. 1. Fig. 4 is a detail showing the counterbalancing-spring. Figs. 5 and 6 are details of the mechanism that controls the movement of the reel fore and aft. Figs. 7 and 8 are details of the devices used in controlling the movement of the reel vertically, and Fig. 9 is a perspective view showing the lever-brace.

My invention relates to reel-supporting devices of the kind in which one lever is used for adjusting the reel in the two required directions—namely, fore and aft and up and down—and may be considered as an improvement upon those shown in the patent of John F. Steward, dated July 27, 1886, and numbered 346,232.

A is a casting upon which the reel-standard B is pivoted and may be considered, together with the bar A' and strut $A^2$, as parts of the harvester-frame. The reel-standard B, as shown, is pivoted at $b$ and $b'$ in the casting A at its lower end and at its upper end has arms $b^2$ and $b^3$, to which the reel-bracket C is in turn pivoted by means of outreaching arms $c^2$ and $c^3$. The bracket C terminates forwardly in a sleeve $c$, in which is rotatably supported the reel-spindle D. Secured to the said spindle is the sprocket-wheel $D^2$ and reel-spider D', the latter having the reel-arms attached thereto in the usual manner.

A shaft E is supported in the pivotal arms of the bracket C and standard B, preferably coincident with the axis of the pivot. To the outer end of the said shaft and in line with the sprocket-wheel $D^2$ is secured the sprocket-wheel $E^2$, over both of which is thrown the chain $d^2$, which serves to transmit rotation from the shaft E to the reel-shaft D. The said shaft E receives rotation from the harvester-gearing through the instrumentality of the sprocket-wheel F, (secured to the shaft $f$, journaled in the frame-piece A,) the bevel-gears $f'$ and $f^2$, the shaft G, the universal joint H, the shaft I, and the bevel-gears $i$ and $e$.

As far as described the parts are of substantially an old and well-known construction, and hence need no further description, it being sufficient to say that either or any of them may be modified in many ways without interfering with the mechanism in which my invention is exemplified and which will now be described.

To support the bracket C in any desired position of adjustment, a radius-rod J is pivoted at its lower end, preferably upon the ear or lug $a$ of the frame-piece A. In substantially its upper half is a series of holes $j$.

J' is a socket pivotally sustained at $j'$ in the bracket C by means of its trunnion $j^2$ and prevented from getting out of place by a pin, cotter, or other well-known means. This socket is slotted to receive the radius-bar J and has upon its outer side, preferably concentric with its trunnion, a boss $j^3$. A latch-pin $J^2$ is carried in the said boss and projects through the bar J and preferably partly into the hollow trunnion $j^2$, which latch-pin serves as a means to connect the bracket C with the radius-bar J. The pin has been described as projecting partly into the hollow trunnion, it being plain that when so made it affords a better construction, but it may be shortened so as to be carried wholly in the boss $j^3$.

By withdrawing the pin $J^2$ from engagement with the bar J the bracket may be swung upon its pivoted end to either raise or lower the reel, as described.

The means for controlling the latch-pin and adjusting the reel-bracket will now be described.

K is a lever pivoted at $k$ upon what may be considered as a "post" L and extends rearwardly to a point within reach of the operator. The forward end of the lever has a hole K' made therein to adapt it to engage the boss $j^3$. The preferred means of preventing the lever from getting out of engagement with the said boss is a lug or ear $j^4$, cast upon the said boss, and a corresponding notch $k^4$, cut in the end of the lever, the relative positions of the lug $j^4$ and the notch $k^4$ being such that the lever can only be slipped off or on the boss when it is in a position that it never assumes when performing the functions for which it is intended, as best shown in Fig. 8.

Pivoted conveniently upon the lever and shown as pivoted upon the bracket $k^2$ is a bell-crank $k^3$, having a forwardly-projecting arm $k^5$, which engages the latch-pin $J^2$, and having an outwardly-projecting arm $k^6$, to which is attached a rod $k^7$. The latch-pin $J^2$ is engaged by the arm $k^5$, so that it cannot move endwise, suitably, as shown, by means of its head and pin. The rod $k^7$ extends rearwardly to the operator's end of the lever and at its termination is attached to the finger-lever $k^8$. A spring $k^9$ (shown as lying between the lug of the bracket $k^2$ and the arm $k^6$ of the bell-crank and coiled around the rod $k^7$) exerts its tension to force the latch-pin into engagement with the particular hole in the radius-bar J to which it is then opposite.

To adjust the reel to a higher or lower position, the operator, by means of the finger-lever $k^8$ and its connecting mechanism, withdraws the latch-pin from engagement with the radius-bar, and by stress put upon the lever the reel can be moved up or down to the desired position, when the latch is allowed to reëngage the radius-bar.

Referring to Fig. 1, the distance from the center of the socket $J'$ to the pivotal center of the bracket C is shown in the drawings as being much less than the distance from the said socket to the pivot $k$ of the lever K. Hence the movement of the lever in adjusting the bracket through an arc of, for instance, sixty degrees is very much less. By this means sufficient scope of adjustment is given to the reel without moving the hand-lever out of the reach of the operator in his seat.

The weight of the reel offers a resistance greater than itself, through the lever K, against any movement thereby, or, in other words, a greater stress would have to be necessarily applied by the operator to adjust the reel when the leverages are thus compounded for the purpose of obtaining a maximum movement of the reel-bracket by a minimum movement of the hand-lever.

The spring N, hereinafter to be described, is used to counterbalance the weight of the reel for the purpose of reducing the necessary stress put upon the hand-lever by the operator.

To adjust the reel fore and aft, the lever K is used, but its fulcrum instead of being at the point $k$ is upon the boss $j^3$, as will be further understood.

The post L is attached to the bar $A'$, preferably by a pin or bolt $l$, and is slotted, as at $l'$, so as to provide a limited vertical movement upon the said pin or bolt. Its upper end is shown as being bent to form with the socket $k^{10}$ upon the lever the fulcrum $k$.

A latch $l^2$ is secured to the post L in such a position as to engage the notches $m$ in the quadrant M when the weight of the lever forces the post down, so that the pin or bolt $l$ occupies the upper end of the slot $l'$ in the lower end of the said post.

By raising the operator's end of the lever and with it the post L the latch $l^2$ will be disengaged from the quadrant M, and the reel-bracket, standard, and radius-rod can be swung upon the lower pivots fore and aft to any desired position. To hold the reel in that position, the post L can be again allowed to engage the quadrant by means of the latch $l^2$.

To counterbalance the weight of the reel, the arm $c^2$ of the bracket is extended to the rear of the standard B a convenient distance and is provided with convenient means, shown in the drawings as a knob $n$, to which is attached a spring N, which spring is attached at its lower end to a convenient point $n'$ upon the harvester-frame. A lug $n^2$, preferably as one piece with the extension $c^5$ of the arm $c^2$ and located near the pivotal hub of the bracket, is used as means for deflecting the spring N when it is extended, as shown in Fig. 4, so that although the point $n$ is over the pivotal center of the reel-bracket the leverage through which the tension of the spring is exerted to counterbalance the weight of the reel remains the same.

O is a radius-rod extending conveniently from a point $o$ upon the socket $k^{10}$, located upon the upper end of the post L, to a point $o'$ upon the harvester, preferably upon the elevator-frame. The bracket $o$ serves only as means for connecting the brace to the post, and the post and said bracket may be considered to be connected in any suitable manner. Its purpose is to brace the lever K and post L, and in order to allow the parts to be moved to their various positions of adjustment the ends of the brace are universally swiveled. The end $o$ is shown as being hooked into an eye $o^2$ in the socket $k^{10}$, and the end $o'$ has a screw-thread formed thereon to adapt it to engage the nut $o^3$, swiveled at $o^4$ upon the elevator-frame in Fig. 9.

It will be understood from the foregoing that when the post L is rocked fore and aft the end of the rod O will move in the arc of a circle and carry the top of the post with it. In order to permit the same, the point of the post and the bar $A'$ and the slot in the quadrant are so constructed as to permit the post to swing with freedom, and besides this the bar $A'$, post L, and lever K are made very light, so as to admit of all of the lateral motion that the rod O will produce. If the radius-rod O could pivot to the harvester-frame at a point coincident with the axis of movement of the lever L there would be no lateral movement of the latter but for the slot at its lower end.

What I claim as my invention, and wish to secure by Letters Patent, is—

1. The combination of a reel-standard and a reel-bracket pivoted thereto and projecting forwardly therefrom, a radius-bar pivoted upon the harvester-frame and adjustably connected to said bracket, a post pivoted to the rear of said standard upon the harvester-frame and adapted to be swung upon its pivot and locked in various positions of adjustment, and the lever fulcrumed upon the said post and pivotally attached to said bracket at a point forward of the pivotal axis of said bracket whereby the leverages are such that the reel is given sufficient scope of vertical adjustment by a limited movement of the adjustment-lever, substantially as described.

2. The combination of a pivoted reel-standard and reel-bracket pivoted thereto, a radius-rod pivoted upon the harvester-frame and adjustably secured to said bracket by a latch-pin, a post pivoted upon the harvester-frame and adapted to be swung upon its pivot and locked in various positions of adjustment, an adjustment-lever fulcrumed upon said post and pivotally attached to said bracket, a latch-pin-controlling mechanism mounted on said lever whereby the reel can be raised and lowered or moved fore and aft by the use of one lever, substantially as described.

3. The combination of a pivoted reel-standard and reel-bracket pivoted thereto, a radius-rod pivoted upon the harvester-frame and adjustably attached to said bracket by a latch-pin, a post pivoted to the said harvester-frame by a slotted connection and adapted to be swung upon its pivot when moved vertically a limited distance, a latch attached to said post, a quadrant engaged by said latch and an adjustment-lever fulcrumed upon said post, a latch-pin-controlling mechanism mounted upon said lever whereby the reel is raised or lowered or moved fore and aft as desired, substantially as described.

4. The combination of a reel-standard and a reel-bracket pivoted thereto and suitably held in its various positions of vertical adjustment, a lever-support having a latch pivoted upon the harvester-frame and connected by a pivot that will allow it to have a longitudinal movement, the said support adapted to be swung upon its pivot and locked in various positions of fore-and-aft adjustment, a quadrant adapted to be normally engaged by said latch and to be disengaged therefrom by the longitudinal movement of said support, a lever fulcrumed upon said post and a radius-rod connected to said post by a universal joint and to a convenient point upon the harvester-frame by a loose joint, said radius-rod extending at substantially a right angle to said post whereby the said post is permitted to swing upon its pivot and to be moved vertically, substantially as described.

CHARLES A. ANDERSON RAND.

Witnesses:
ARTHUR JOHNSON,
LOUIS O. HENSSLER.